O. A. ECKRE.
SPRING WHEEL.
APPLICATION FILED SEPT. 18, 1917.
1,317,913.
Patented Oct. 7, 1919.
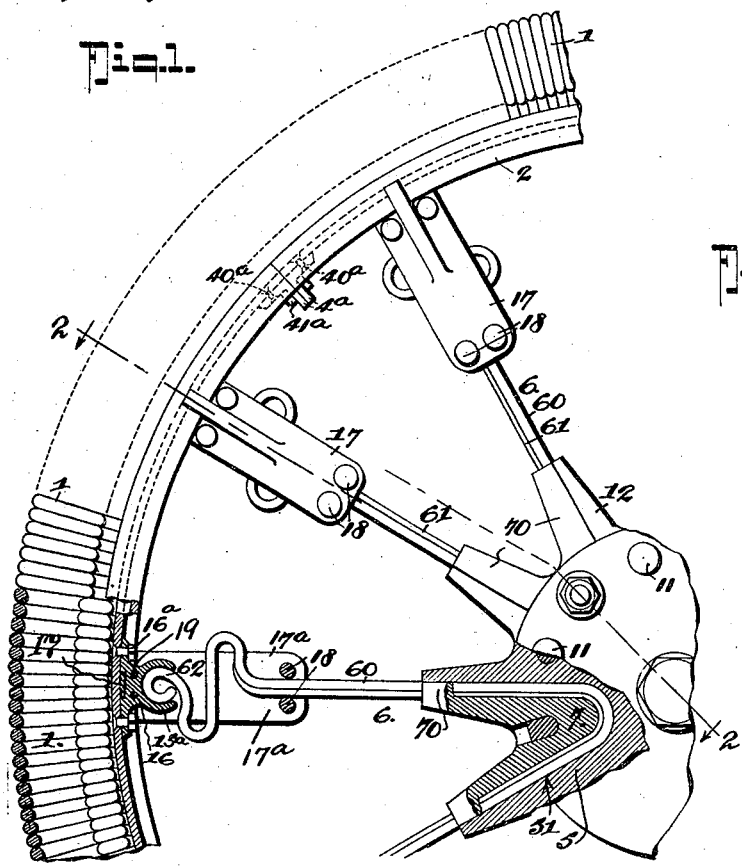
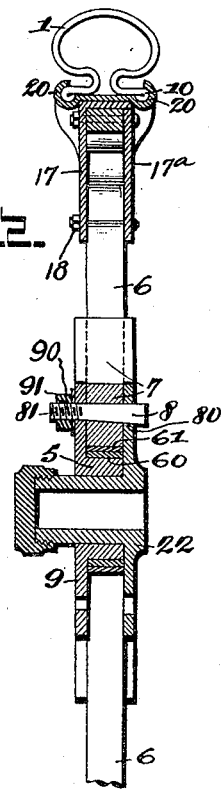
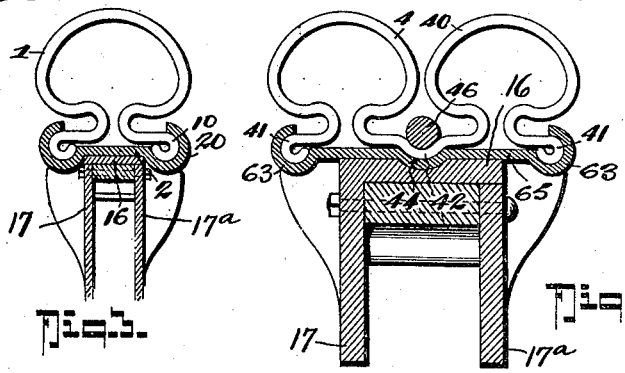
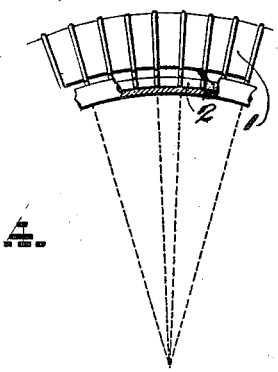
INVENTOR
Olof A. Eckre.
BY
Fred G. Dieterich
ATTORNEYS

UNITED STATES PATENT OFFICE.

OLOF A. ECKRE, OF KINDRED, NORTH DAKOTA.

SPRING-WHEEL.

1,317,913.   Specification of Letters Patent.   Patented Oct. 7, 1919.

Original application filed May 8, 1917, Serial No. 167,333. Divided and this application filed September 18, 1917. Serial No. 192,001.

*To all whom it may concern:*

Be it known that I, OLOF A. ECKRE, a citizen of the United States, residing at Kindred, in the county of Cass and State of North Dakota, have invented certain new and useful Improvements in Spring-Wheels, of which the following is a specification.

My present application, which forms a divisional part of my copending application, Serial No. 167,333, filed May 8, 1917, patented March 12, 1918, No. 1,259,004, has reference to that class of vehicle wheels, the tire or tread portion of which is formed of a series of resilient members assembled to form a continuous tread, and means for holding the entire mass of the said members in rigid relation on the rim and adapted for being individually put into place or removed as required.

My present invention seeks to provide an improved construction of rim combined with an improved tread portion including arch shaped springs adapted for being individually placed in operative condition relatively to the mass of springs that form the complete tire or tread surface and a simple and effective means for locking up the said mass of arch shaped spring members and holding them upon the wheel rim in such rigid condition, whereby to present a tread or tire surface of great tractive power and particularly adapted for heavy trucks and like vehicles.

With other objects in view, my present invention consists in the peculiar construction and novel combination of the parts hereinafter explained, specifically pointed out in the appended claims and illustrated in the accompanying drawings, in which:

Figure 1 is an elevation, parts being in section, of a spring wheel embodying my invention.

Fig. 2 is a transverse section of a portion thereof, taken on the line 2—2 on Fig. 1.

Fig. 3 is a detail cross section through the wheel rim and illustrates the simplest form of my spring wheel rim construction.

Fig. 4 is a similar view that illustrates a modified form of my invention and more especially adapted for heavy trucks and other like vehicles.

Fig. 5 is a diagrammatic elevation, partly in section, of a further modification of the tread units.

Fig. 6 is a detail side elevation, partly in section, of the split portion of the wheel rim, the ends thereof being shown separated to permit the insertion of the tread units hereinafter specifically referred to.

My spring wheel improvements are designed for use as a substitute for the ordinary sizes of motor vehicle wheels, and the tire or tread surface thereof is built up of small arch shaped wire springs 1, the specific construction of which is shown in detail in Fig. 3, by reference to which it will be seen that the free ends of the spring wire are bent back to form circular loops 10—10 designed for being edgewise fitted into engagement with annular circular pockets 20—20 formed in the opposite edges of the rim or felly 2, which may be shaped up of segmental sections but is preferably a single member split at one point, as indicated by 21 (see Fig. 6) whereby the ends may be readily spread apart for inserting the thread rings 1, one at a time in successive contacting relation until a complete annular tread is built up on the peripheral face of the felly or rim.

For holding the spring rings or tread portions in rigid relation and in proper place upon the rim 2, I employ the locking means best shown in Figs. 1 and 6 in which $4^a$—$4^a$ designate a pair of angled brackets that are secured by rivet bolts $40^a$ to the adjacent split rim edges and the latter are held closed together by a clamp bolt and nut $41^a$ that passes through the abutting members $42^a$ of the brackets $4^a$, as is clearly shown in Figs. 1 and 6.

The body of the wheel in the construction shown in the drawing includes a series of spring spokes 6, all of which are constructed alike and consist each of a substantially V-shaped main heavy flat spring member 60 and a supplemental like shaped spring member 61 of less thickness than the main spring member 60 and of somewhat less length than the said member 60, as is clearly shown in Fig. 1, from which it will be also seen that the member 61 lies on the inner face of the outer spring member 60 and the V-shaped ends of the two spring members 60 and 61 snugly fit corresponding V-shaped radial pockets 51 in the hub casing 5 and are securely held by V-shaped clamps 7 secured down against the bent or loop ends of the spring members 60 and 61 by wedge shaped cross bolts 8 that pass through slots 80 in the hub plate 22 and have their threaded or bolt ends 81 extended through suitable apertures 90 in the hub plate 9 and secured by nuts 91, it being understood that by tightening up the nuts 91, the wedge bolts 8 will be drawn down into a crotch of the V-shaped clamp 7 that secures the inner ends of the spring spoke members and the hub.

11—11 designate other bolts that fasten the hub plate 9 in the desired fixed position on the hub.

Each of the radial hub members in the construction shown in the drawings, between which the inner ends of the springs 60 and 61 are secured, have outwardly projected lugs 12—12 that form side bearings for one of the edges of the springs 60 and 61 and the V-shaped clamp 7 has like lugs 70—70 that engage the opposite side edges of the springs 60 and 61 and the said two opposing lugs 12 and 70 serve to hold the inner ends of the springs 60 and 61 from buckling laterally, the hub plate 22 also materially aiding in holding the hub and spring connections in rigid relation to prevent dishing of the wheel at the hub portion thereof.

The outer ends of the main spring members 60 are bent and formed into S-shaped bearing portions and the said portions terminate in circular loops 62 that seat in circular-like sockets 15ª in bearings 16 secured to the rim or felly by bolts 16ª, see Figs. 1, 2, 3 and 4, in which figures is also shown side plates 17 and 17ª, one of which, 17, is L shaped and has one portion extended through a groove in the bearing block 16. The other plate 17ª is removably secured, at one end, to the bearing 16 and adjacent the socket 15ª and also to the other plate 17, by bolt connections 19.

At the other or inner ends, the plates 17 and 17ª are connected by a pair of cross bolts 18—18, see Figs. 1 and 2, which bolts also serve as guides and braces for the spring spokes 6.

In Fig. 4 is illustrated a modified form of the rim structure and the same embodies the general characteristics of the rim construction shown in Figs. 1, 2 and 3. The said modified form is more particularly intended for heavy vehicles and tractors and it has a tire structure in which the tread or tractive surface is composed of independent stout wire spring members, each formed in two distinct arched ring portions 4—40, the opposing ends of which terminate in circular loops 41—41 and between the said loops 41—41 the wire is bent into a central loop 42.

In the latter form of my invention, the rim 65 has its opposite edges made with annular pockets 63—63 and along the middle it has a semi-circular internally extended annular groove or pocket 44 that receives the central wire loop 42.

The rim 65 is also cut to provide for spreading its ends when it is desired to slip the double arch wire rings sidewise through the said rim ends and to abut against the other assembled tire rings, it being understood that the same kind of means is used for locking the rim ends together as in the other form of my invention, for connecting the said ends of the said modified rim structure.

To secure the double arched spring rings along their central annular line, a clamp ring 46 is provided that holds the said double tire along the center of the rim and to take up slack, the said ring 46 may have its ends joined by turn buckle connections of any approved construction.

The spoke structure and the means for securing the spokes to the hub are the same as are the like parts in the single tread tire structure.

From the foregoing description read in connection with the drawings, the complete construction of both forms of my spring wheel will be readily understood.

While the spoke and hub structure shown and described provides for a uniform resilient hanging of the hub, relatively to the rim, the spring tread will take up the jars and shocks incident from road condition and also aid in giving the wheel the desired amount of resiliency without rendering it unstable and subject to undue lateral or twist strains.

The coöperative connection of the parts that constitute the wheel is such, that the said parts may be easily assembled in their proper operative relation, securely held and also adapted for being easily disconnected in case of repairs.

Instead of making all of the tread units of round wire, they may be made of alternate round and flat wire members, as indicated in Fig. 5 of the drawings.

What I claim is:

1. In a spring wheel, the combination with a rim; of a tread tire composed of arched spring wires sidewise assembled to form a continuous resilient body, the said rim including separable ends, whereby the spring arched wires can be individually slipped onto and around the rim, interlocking members on the rim and the arched springs and means for securing the separable ends of the rim together for securing the arched spring wires on the rim in rigid relation.

2. In a spring wheel, the combination with a split rim having annular pockets at the opposite edges; of a tread tire composed of a series of arched spring members whose ends terminate in loops adapted for being endwise inserted between the split ends of the rim with the loops arranged for being slid into the rim pockets, whereby an assembled set of springs is mounted on the periphery of the rim, and means for clamping the rim against being spread, whereby to hold the said assembled spring members in rigid relation on the rim.

3. In a spring wheel, the combination with a metal split rim having annular pockets at the opposite edges and an annular groove midway the said edge pockets; of a tread composed of a series of spring wires each bent to form a double arch and with the opposite ends turned up into circular loops adapted for being interlocked with and slid along the edge pockets on the rim, that portion of the spring wire between the said arched portions being bent into a loop adapted for seating in the annular groove in the rim, means for holding the centrally looped portions of the assembled spring wires down in the annular groove in the rim and means for closing up and locking the ends of the split rim together whereby to provide a resilient tire of assembled double arched shaped spring wire loops held in close contact and extending entirely around the vehicle rim.

4. In a spring wheel, the combination with a split rim having an annular pocket at each edge; of a tire composed of arched spring units, each of which has its opposite ends bent into circular loops adapted for being edgewise inserted between the ends of the split rim for slidably engaging the annular pockets on the rim and bent into a central loop between the circular loops, and means whereby to hold the said arched spring units in rigid relation around the rim.

OLOF A. ECKRE.

Copies of this patent may be obtained for five cents each, by addressing the "Commissioner of Patents, Washington, D. C."